US007860055B2

(12) United States Patent
Hayasaka

(10) Patent No.: US 7,860,055 B2
(45) Date of Patent: Dec. 28, 2010

(54) WIRELESS CHANNEL DETERMINATION/SELECTION METHOD AND ACCESS POINT DEVICE

(75) Inventor: Mitsuharu Hayasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 624 days.

(21) Appl. No.: 11/619,812

(22) Filed: Jan. 4, 2007

(65) Prior Publication Data
US 2007/0171863 A1 Jul. 26, 2007

(30) Foreign Application Priority Data
Jan. 24, 2006 (JP) ............................. 2006-015329

(51) Int. Cl.
*H04W 4/00* (2009.01)
(52) U.S. Cl. ....................... 370/329; 370/338
(58) Field of Classification Search ................. 370/329, 370/338
See application file for complete search history.

(56) References Cited

U.S. PATENT DOCUMENTS

| 5,471,671 | A  | * | 11/1995 | Wang et al. ............... 455/226.2 |
| 6,175,739 | B1 | * | 1/2001  | Ishii et al. ................. 455/452.1 |
| 6,408,172 | B1 | * | 6/2002  | Alperovich et al. ....... 455/404.1 |
| 6,728,484 | B1 | * | 4/2004  | Ghani ............................. 398/42 |
| 6,732,163 | B1 |   | 5/2004  | Halasz |
| 2005/0107107 | A1 | * | 5/2005 | Shahidi et al. ............... 455/522 |
| 2005/0124335 | A1 | * | 6/2005 | Cave et al. ................ 455/422.1 |
| 2006/0291401 | A1 | * | 12/2006 | Yuen et al. ................... 370/252 |
| 2007/0081459 | A1 | * | 4/2007 | Segel et al. .................. 370/230 |

FOREIGN PATENT DOCUMENTS

| EP | 0 917 317 A1 | 5/1999 |
| EP | 1 257 092 A1 | 11/2002 |
| GB | 2 414 896 A | 12/2005 |
| JP | 6-334597 | 12/1994 |
| JP | 2002-158667 | 5/2002 |
| JP | 2002-271336 | 9/2002 |
| JP | 2004-96595 | 3/2004 |
| JP | 2005-142777 | 6/2005 |

* cited by examiner

*Primary Examiner*—Kent Chang
*Assistant Examiner*—Ronald Eisner
(74) *Attorney, Agent, or Firm*—Oblon, Spivak, McClelland, Maier & Neustadt, L.L.P.

(57) ABSTRACT

A wireless channel determination/selection method for use in an access point device configuring a wireless LAN system with a terminal device is disclosed. The method includes: a first step of selecting sequentially a wireless channel available for use, detecting a reception signal level for each of the wireless channels, determining whether a wireless LAN signal is included, and receiving data transmission/reception state notice information that is inserted in a beacon frame provided by another access point device to indicate a state of data transmission/reception at the another access point device; a second step of detecting, from the received data transmission/reception state notice information, a data transmission/reception level at the another access point device for each of the wireless channels; and a third step of determining and selecting any of the wireless channels considered optimum for communications.

3 Claims, 7 Drawing Sheets

FIG. 5A

| i | CHANNEL 1 | CHANNEL 2 | CHANNEL 3 |
|---|---|---|---|
| AS (DETERMINATION RESULT ABOUT EXISTENCE OF WIRELESS LAN SIGNAL) | NO | YES | YES |
| LV (DETECTION VALUE OF RECEIVED SIGNAL LEVEL) | 0.1 | 0.3 | 0.9 |
| DLV (DETECTION VALUE OF DATA TRANSMISSION/RECEPTION LEVEL) | 0 | 1 | 4 |

FIG. 5B

| i | CHANNEL 1 | CHANNEL 2 | CHANNEL 3 |
|---|---|---|---|
| AS (DETERMINATION RESULT ABOUT EXISTENCE OF WIRELESS LAN SIGNAL) | YES | YES | YES |
| LV (DETECTION VALUE OF RECEIVED SIGNAL LEVEL) | 0.5 | 0.3 | 0.7 |
| DLV (DETECTION VALUE OF DATA TRANSMISSION/RECEPTION LEVEL) | 2 | 1 | 3 |

FIG. 5C

| i | CHANNEL 1 | CHANNEL 2 | CHANNEL 3 |
|---|---|---|---|
| AS (DETERMINATION RESULT ABOUT EXISTENCE OF WIRELESS LAN SIGNAL) | YES | YES | YES |
| LV (DETECTION VALUE OF RECEIVED SIGNAL LEVEL) | 0.7 | 0.4 | 0.3 |
| DLV (DETECTION VALUE OF DATA TRANSMISSION/RECEPTION LEVEL) | 3 | 1 | 1 | ived signal in wireless channels, and measuring the volume of a packet traffic in each of the wireless channels.

WIRELESS CHANNEL DETERMINATION/SELECTION METHOD AND ACCESS POINT DEVICE

CROSS REFERENCES TO RELATED APPLICATIONS

The present invention contains subject matter related to Japanese Patent Application 2006-015329 filed in the Japanese Patent Office on Jan. 24, 2006, the entire contents of which being incorporated herein by reference.

BACKGROUND OF THE INVENTION

1. Field of the Invention

The present invention relates to an access point device that configures a wireless LAN system with a terminal device, and a wireless channel determination/selection method for use in the access point device.

2. Description of the Related Art

With a wireless LAN system configured by an access point device and a terminal device, communications is performed through selection of wireless channels from a frequency range of 2.4 GHz, 5.2 GHz, or others, which are defined by IEEE 802.11. In the environment for the wireless LAN system to use, when there is another wireless LAN system, there needs to select a wireless channel suited for communications from many others available for use.

For the selection of a wireless channel, previously, channels available for use are scanned, i.e., sequentially selected, in the access point device, and each of the channels is checked whether or not a wireless LAN signal is included therein. As such, any channel not including the wireless LAN signal is eventually selected.

With such a previous selection method, however, the use efficiency of wireless channels is impaired. This is because if the traffic volume of a channel is a level not affecting data transmission/reception in the wireless LAN system, the channel is not selected, e.g., when a wireless LAN signal found in a channel is only a beacon frame, which is provided by another access point device at regular intervals.

Exemplified here is a case where three channels of 1, 2, and 3 are wireless channels available for use, and there are one or more wireless LAN systems for these channels 1, 2, and 3. The data transmission/reception is large in volume in channels 1 and 2, and no data transmission/reception is performed in the channel 3. In this case, the channel 3 is desirably selected as being optimum for communications in the wireless LAN system. However, with the above previous selection method, the channel 3 is not always eventually selected because the existence of a wireless LAN signal is an only determination factor to determine and select a wireless channel.

For betterment, Patent Document 1 (JP-A-2002-271336) describes a method of a terminal device issuing a request to an access point device for a wireless channel change based on monitoring of an error ratio observed to a transmission/reception packet in the terminal device.

Patent Document 2 (JP-A-2005-142777) describes a method of an access point device changing a wireless channel based on its monitoring of an error ratio observed to a packet transmitted thereby.

Patent Document 3 (JP-A-2002-158667) describes a method of selecting a clear wireless channel based on an access point device checking whether there is a wireless LAN

SUMMARY OF THE INVENTION

As described in Patent Documents 1 and 2, with the method of a terminal device issuing a request to an access point device for a wireless channel change based on monitoring of a packet error ratio, or the method of an access point device taking charge of a wireless channel change, there are problems as below. That is, there is no way of knowing whether a specific wireless channel is clear and suitable for communications until both the access point device and the terminal device are switched to this channel for actual data transmission/reception therebetween, and until any communications failure occurs therebetween. As such, it takes time for the selection of a wireless channel suitable for communications.

Also with the method of Patent Document 3, there needs to measure the traffic volume of a packet in each of the channels at the time of channel scanning, thereby taking time to eventually select any specific wireless channel suitable for communications. In the practical sense, to perform monitoring with reliability, a few to several tens of seconds are required for one channel, and several tens of seconds for several channels. As a result, the users' usability is considerably impaired if they are establishing real-time communications between the access point device and the terminal device. e.g., video data transmission.

It is thus desirable to enable determination and selection of a communications-optimum wireless channel with short-time processing even if wireless channels available for use all include a wireless LAN signal, with no need for data transmission/reception between an access point device and a terminal device in a wireless LAN system, and with no need for monitoring of a packet traffic volume and a packet error ratio in the access point device or the terminal device.

According to an embodiment of the present invention, there is provided a wireless channel determination/selection method for use in an access point device configuring a wireless LAN system with a terminal device that includes: a first step of selecting sequentially a wireless channel available for use, detecting a reception signal level for each of the wireless channels, determining whether a wireless LAN signal is included, and receiving data transmission/reception state notice information that is inserted in a beacon frame provided by another access point device to indicate a state of data transmission/reception at the another access point device; a second step of detecting, from the received data transmission/reception state notice information, a data transmission/reception level at the another access point device for each of the wireless channels; and a third step of determining and selecting any of the wireless channels considered optimum for communications through reference to, for each of the wireless channels, a value being a detection result of the reception signal level, a determination result of whether the wireless LAN signal is included, and a value being a detection result of the data transmission/reception level. In the third step, when any of the wireless channels available for use is detected as not including the wireless LAN signal, any of the detected wireless channels whose value being the detection result of the reception signal level is minimum is determined and selected as being optimum for communications, and when all of the wireless channels available for use are detected as including the wireless LAN signal, any of the detected wireless channels whose value being the detection result of the data transmission/reception level is minimum is determined and selected as being optimum for communications, and when the wireless channel whose value being the detection result of the data transmission/reception level is minimum is found plural, any of the detected wireless channels whose value being the detection result of the reception signal level is minimum is determined and selected as being optimum for communications.

In the embodiment of the invention, such a method enables to determine and select a communications-optimum wireless channel with short-time processing even if wireless channels available for use all include a wireless LAN signal, with no need for data transmission/reception between an access point device and a terminal device in a wireless LAN system, and with no need for monitoring of a packet traffic volume and a packet error ratio in the access point device or the terminal device.

BRIEF DESCRIPTION OF THE DRAWINGS

FIG. 5 is a diagram showing another exemplary radio state detection process;

DETAILED DESCRIPTION OF THE INVENTION

Figure 1:
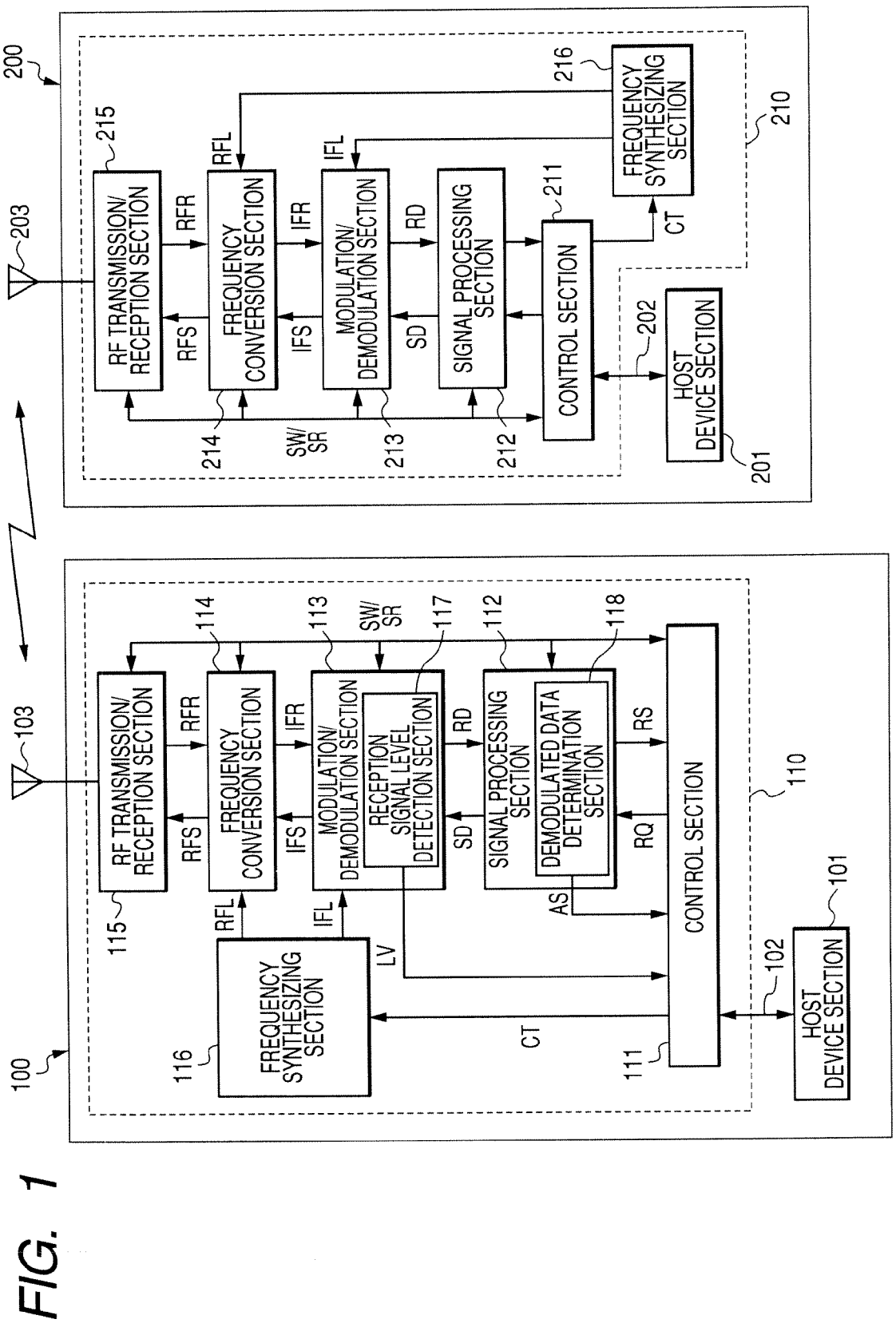
FIG. 1 is a diagram showing an exemplary access point device of an embodiment of the invention together with a terminal device.

1. Configuration of Wireless LAN System: FIG. 1

FIG. 1 shows an exemplary wireless LAN system according to an embodiment of the invention. The wireless LAN system is configured by an access point device 100, and a terminal device 200.

1-1. General Configuration of Access Point Device

The access point device 100 includes a host device section 101 exemplified by a personal computer or others as a section for higher function. To the host device section 101, a wireless LAN module 110 is connected via an interface 102, and the wireless LAN module 110 is connected with an antenna 103.

The wireless LAN module 110 is configured to include a control section 111, a signal processing section 112, a modulation/demodulation section 113, a frequency conversion section 114, an RF transmission/reception section 115, and a frequency synthesizing section 116. The control section 111 is a microcomputer including a CPU, a ROM, a RAM, and others.

When the access point device 100 receives a signal, in response to a control signal SR for signal reception switching, the control section 111 flips, to signal reception, a switch of circuits of the components, i.e., the RF transmission/reception section 115, the frequency conversion section 114, the modulation/demodulation section 113, and the signal processing section 112. The control section 111 also makes a power supply to the circuits specifically for their signal-reception active elements, and cuts off a power supply to the circuits specifically for their signal-transmission active elements so that the circuits are put into the state ready for signal reception.

At the same time, the control section 111 exercises control over the frequency synthesizing section 116 using a frequency synthesizing control signal CT. Through such control, an RF local signal RFL provided by the frequency synthesizing section 116 to the frequency conversion section 114 is changed to a signal of a frequency corresponding to a specific wireless channel.

As such, in the access point device 100 being in the state ready for signal reception for the wireless channel, when an RF signal is received by the antenna 103 during operation, the RF signal goes through a filter in the RF transmission/reception section 115, and is amplified by an amplifier circuit therein. Thereafter, the resulting signal is supplied to the frequency conversion section 114 as an RF reception signal RFR.

In the frequency conversion section 114, the RF reception signal RFR is down-converted by a mixer in the frequency conversion section 114 in response to the RF local signal RFL coming from the frequency synthesizing section 116. The resulting signal is supplied to the modulation/demodulation section 113 as an IF reception signal IFR.

In the modulation/demodulation section 113, the IF reception signal IFR is down-converted to be a baseband signal by a mixer in the modulation/demodulation section 113. This down conversion is performed in response to an IF local signal IFL coming from the frequency synthesizing section 116.

The baseband signal is then used for data demodulation in a demodulation circuit of the modulation/demodulation section 113. The resulting demodulation data (reception data) RD is supplied to the signal processing section 112.

In the signal processing section 112, a demodulation data determination section 118 determines whether the demodulation data RD is a wireless LAN signal or not. This determination is made based on the data format of the demodulation data RD. Only when the demodulation data RD is of a predetermined format as a wireless LAN signal, and when the data is valid as a wireless LAN signal, the demodulation data RD is supplied to the control section 111 as a demodulation signal RS.

The control section 111 sends out, if required, the demodulation signal RS to the host device section 101 via the interface 102.

The access point device 100 periodically sends out a beacon signal. For such signal sending out, at a timing of resetting a timer provided in the control section 111 for the purpose, the control section 111 supplies a beacon frame send-out request signal RQ to the signal processing section 112. The control section 111 also puts the circuits of the components into the state ready for signal transmission using a control signal SW for signal transmission switching. The components include the signal processing section 112, the modulation/demodulation section 113, the frequency conversion section 114, and the RF transmission/reception section 115.

In such a state ready for signal transmission, the beacon frame send-out request signal RQ is supplied to the modulation/demodulation section 113 as transmission data SD, and then is up-converted to be an IF transmission signal IFS. This up conversion is performed in response to the IF local signal IFL coming from the frequency synthesizing section 116.

The IF transmission signal IFS is then up-converted to be an RF transmission signal RFS in the frequency conversion section 114. This up conversion is performed in response to the RF local signal RFL coming from the frequency synthesizing section 116. The resulting RF transmission signal RFS is amplified by the RF transmission/reception section 115, and then in sent out by the antenna 103 to the air as radio waves.

Note here that the beacon frame is surely not restrictive, and any other types of frames such as data frame are to be transmitted with any similar process and procedure.

1-2. Configuration for Determination and Selection of Wireless Channel Optimum for Communications Described above is the general access point device, and in this example, the access point device 100 is configured as below for determination and selection of a wireless channel optimum for communications.

First of all, the access point device 100 inserts data transmission/reception state notice information into a beacon frame. The data transmission/reception state notice information indicates the state of data transmission/reception in the access point device 100. Such information insertion is performed for determination and selection of a wireless channel in another access point device of the configuration same as the access point device 100 existing in the same use environment. As such, the data transmission/reception state notice information is transmitted together with the beacon frame.

In an exemplary configuration of the access point device 100, the host device section 101 monitors, for a specific length of time, data transmission/reception performed by its own access point device 100. Through such monitoring, the host device section 101 detects a data transmission/reception level in its own access point device 100, and sends out the detection result to the control section 111 periodically at a timing of resetting a timer provided inside for the purpose. Based on the detection result, the control section 111 generates a beacon frame.

In the access point device 100, for determination and selection of a wireless channel inside, a reception signal level detection section 117 of the modulation/demodulation section 113 detects a level of the IF reception signal IFR for every channel. Such level detection is performed when the circuits of the wireless LAN module 110 are changed in state to be ready for signal reception, and when channels available for use are scanned, i.e., sequentially selected, by the control exercised over the frequency synthesizing section 116 using the frequency synthesizing control section CT. The value LV of the resulting reception signal level is then recorded on a memory inside of the control section 111, e.g., RAM.

When the channels available for use are scanned as such in the state ready for signal reception, the demodulation data determination section 118 in the signal processing section 112 determines, for every channel, whether the demodulation data RD is a wireless LAN signal or not, i.e., whether a wireless LAN signal is included or not. The determination result (determination signal) AS is then recorded on a memory inside of the control section 111, e.g., RAM.

When the channels available for use are scanned as such in the state ready for signal reception, the wireless LAN module 110 receives, for every channel, data transmission/reception state notice information coming from another access point device of the configuration same as its own access point device existing in the same use environment. The data transmission/reception state notice information is inserted in a beacon frame, and indicates the data transmission/reception state of another access point device being the sender of the information. The information is recorded on a memory inside of the control section 111, e.g., RAM. As will be described later, thus received data transmission/reception state notice information is used for detection of a data transmission/reception level in another access point device.

The data transmission/reception level in the access point device is defined by three levels of 1, 2, and 3, which will be described later.

1-3. Configuration of Terminal Device

The terminal device 200 is configured as a general terminal device with no specific difference therefrom.

That is, the terminal device 200 includes a host device section 201 exemplified by a notebook personal computer, any specific display terminal, or others as a section for higher function. To the host device section 201, a wireless LAN module 210 is connected via an interface 202, and the wireless LAN module 210 is connected with an antenna 203.

The wireless LAN module 210 is configured to include, similarly to the wireless LAN module 110 of the access point device 100, a control section 211, a signal processing section 212, a modulation/demodulation section 213, a frequency conversion section 214, an RF transmission/reception section 215, and a frequency synthesizing section 216. For reception and transmission of a wireless LAN signal, the wireless LAN module 210 operates similarly to the wireless LAN module 110 of the access point device 100.

2. Wireless Channel Determination and Selection Method: FIGS. 2 to 8

Figure 2:
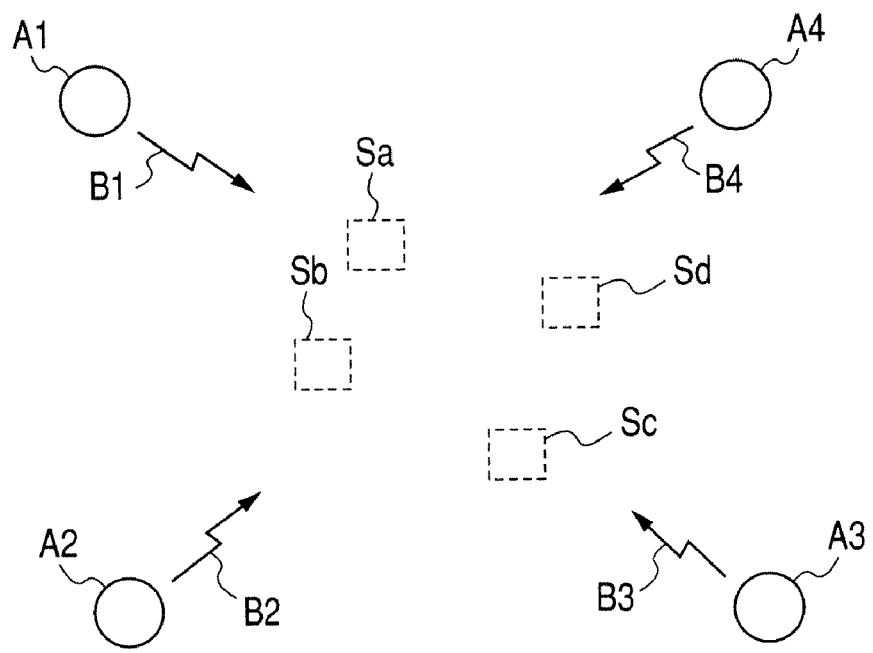
FIG. 2 is a diagram showing an exemplary use environment of a wireless LAN system.
Figure 3:
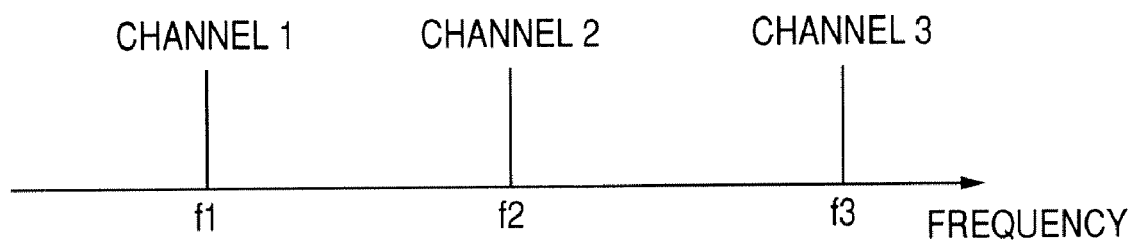
FIG. 3 is a diagram showing exemplary wireless channels available for use.

2-1. Use Environment and Wireless Channels Available for Use: FIGS. 2 and 3

FIG. 2 shows an exemplary environment in which a plurality of wireless LAN systems are configured with a plurality of access point devices.

In this exemplary environment, an area of a fixed size includes four access point devices A1, A2, A3, and A4. These access point devices A1, A2, A3, and A4 are all configured as the access point device 100 of FIG. 1. When activated, these access point devices periodically transmit beacon frames B1, B2, B3, and B4, respectively, and transmit the above-described data transmission/reception state notice information together with their corresponding beacon frames B1, B2, B3, and B4.

A user is allowed to configure a wireless LAN system using any arbitrary terminal device and any arbitrary access point device, e.g., configure a wireless LAN system using a terminal device Sc and the access point device A1, a wireless LAN system using a terminal device Sd and the access point device A2, a wireless LAN system using a terminal device Sa and the access point device A3, or a wireless LAN system using a terminal device Sb and the access point device A4.

FIG. 3 shows exemplary wireless channels available for use. Exemplified here is a case where three channels 1, 2, and 3 are available for use respectively with frequencies f1, f2, and f3 of a specific frequency range. This is surely not restrictive, and one or more channels with frequency setting in a specific range, e.g., 2.4 GHz, or one or more channels with frequency setting in another range, e.g., 5.2 GHz, may be made available for use. Exemplified below is a case where the channels 1, 2, and 3 of FIG. 3 are all available for use as wireless channels.

Figure 4:
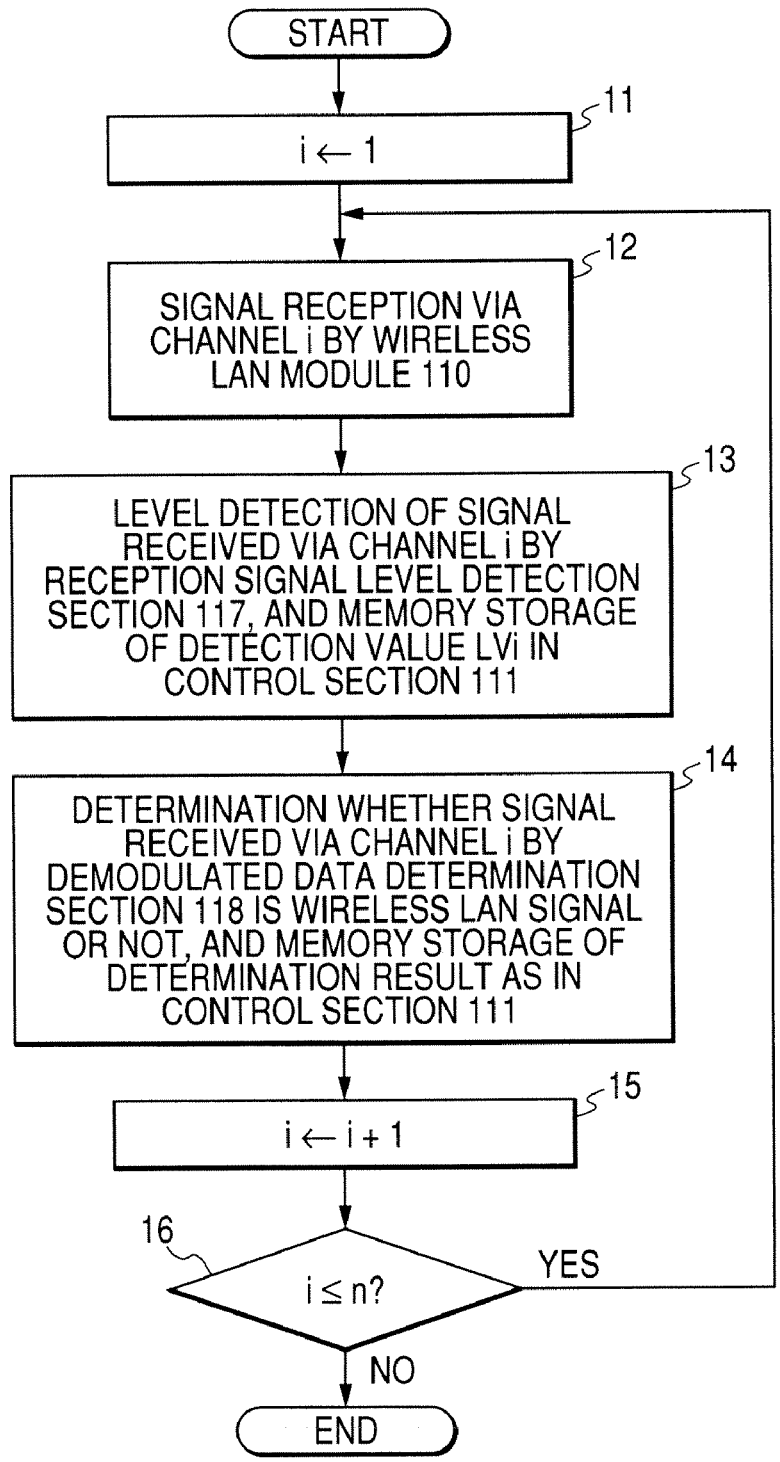
FIG. 4 is a diagram showing an exemplary radio state detection process.

2-2. Detection of Radio State: FIGS. 4 and 5

Prior to determining and selecting a wireless channel optimum for communications, the access point device changes the state of circuits in the wireless LAN module 110 of FIG. 1 to be ready for signal reception. Through control exercised over the frequency synthesizing section 116 using a frequency synthesizing control signal CT, the access point device then scans any channels available for use. By channel scanning as such, as described in the foregoing, the access point device detects a reception signal level for each of the channels, and determines whether the channels include a wireless LAN signal. Thereafter, the access point device receives data transmission/reception state notice information inserted in a beacon frame provided by any other access point device.

Such a radio state detection process is executed by the control section 111 (the CPU in the control section 111) of the access point device, for example, 1. when the access point device is activated, i.e., when the access point device is turned on, 2. periodically at a timing of resetting a timer provided for a specific purpose, 3. when the transmission/reception data in the access point device is detected as showing a predetermined error ratio, or 4. in response to a request coming from the terminal device.

FIG. 4 shows an exemplary radio state detection process. With the radio state detection process in this example, first in step 11, a channel number i is set to 1, i.e., the channel 1 is selected. Then in step 12, the channel i, i.e., the channel 1, is firstly used to receive a signal in the wireless LAN module 110.

The procedure then goes to step 13, and the reception signal level detection section 117 detects the level of the signal received by the channel i in step 12. The resulting detection value LVi is recorded on a memory inside of the control section 111.

Then in step 14, the demodulation data determination section 118 determines whether or not the signal received by the channel i in step 12 is a wireless LAN signal. The determination result (determination signal) AS is then recorded on a memory inside of the control section 111.

Then in step 15, the channel number i is incremented only by 1, and the procedure goes to step 16. In step 16, a determination is made whether the incremented channel number i is n or smaller, i.e., when a wireless channel available for use is any of the channels 1, 2, and 3, a determination is made whether the incremented channel number i is 3 or smaller.

When the incremented channel number i is n or smaller, the procedure returns from step 16 to step 12 for signal reception by the channel i after incrementation, level detection of the received signal, and determination whether the received signal is a wireless LAN signal or not.

After the sequential selection of wireless channels available for use, i.e., when wireless channels available for use are three channels of 1, 2, and 3, after the sequential selection of the channels 1, 2, and 3, if the determination result of step 16 tells that the incremented channel number i exceeds n, i.e., if the channel number i becomes 4 when the wireless channels available for use are three channels of 1, 2, and 3, the radio state detection process is ended.

The data transmission/reception state notice information inserted in a beacon frame provided by any other access point device is received in step 12 of the radio state detection process. Using thus received data transmission/reception state notice information, a data transmission/reception level is detected after step 12 in the radio state detection process, e.g., immediately after step 12 or step 14, or during a wireless channel determination/selection process (will be described later) that follows the radio state detection process for execution.

The data transmission/reception level is defined by three scales as below, for example.

The level 1 (No Data) shows the state in which no data is exchanged between the access point device and the terminal device, i.e., data exchange therebetween merely includes beacon frames coming from the access point device, or a piece of management frame once in a while.

The level 2 (Best Effort Data) shows the state in which data is indeed exchanged between the access point device and the terminal device but not in real time as guaranteed by QoS (Quality of Service).

The level 3 (QoS Data) shows the state in which data is exchanged between the access point device and the terminal device in real time as guaranteed by QoS.

When the data transmission/reception state notice information coming from a plurality of access point devices is received by one channel, the data transmission/reception state notice information of each of the access point devices is individually subjected to detection of a data transmission/reception level at the access point device. The resulting values of the detected data transmission/reception levels are all added together for use as a data transmission/reception level detection value DLV for the channel.

When a plurality of wireless LAN systems operate on one channel, and when their wireless LAN signals are sufficient in level to cause radio interference there among, the data transmission/reception is affected more as the data transmission/reception level gets higher.

In the embodiment of the present invention, the access point devices inform one another the data transmission/reception level of their own, and using as a determination/selection factor the data transmission/reception levels informed by other access point devices as such, each of the access point devices determines and selects a wireless channel for its own. This enables to make a wireless channel determination with efficiency, and to select, as being optimum for communications, any wireless channel considered as being the least likely to cause interaction to data transmission/reception.

FIGS. 5A, 5B, and 5C each show examples of a reception signal level detection value LV, a determination result AS about the existence of a wireless LAN signal, and a data transmission/reception level detection value DLV for every channel at the access point device.

Exemplified here is a case that the access point device A1 of FIG. 2 determines and selects a wireless channel optimum for communications in the access point device A1 while serving as one specific access point device, and the access point devices A2, A3, and A4 as other access point devices.

FIG. 5A shows the following cases, for example.

a1. With the channel 1, although there is no wireless LAN signal and no beacon frame (not detected), the reception signal level detection value LV is not 0 for the channel 1 due to interference waves such as electromagnetic wave coming from a microwave oven or others.

a2. With the channel 2, only a beacon frame is coming from the access point device A4, and the data transmission/reception level detection value DLV is 1 for the channel 2.

a3. With the channel 3, a wireless LAN signal is exchanged between the access point device A2 and the terminal device Sd with the data transmission/reception level of 2, and between the access point A3 and the terminal device Sa with the data transmission/reception level of 2. The data transmission/reception level detection value DLV with the channel 3 is 4.

FIG. 5B shows the following cases, for example.

b1. With the channel 1, a wireless LAN signal is exchanged between the access point device A2 and the terminal device Sd with the data transmission/reception level of 2, and the data transmission/reception level detection value DLV with the channel 1 is 2.

b2. With the channel 2, a wireless LAN signal is exchanged between the access point device A3 and the terminal device Sa with the data transmission/reception level of 1, and the data transmission/reception level detection value DLV with the channel 2 is 1.

b3. With the channel 3, a wireless LAN signal is exchanged between the access point device A4 and the terminal device Sb with the data transmission/reception level of 3, and the data transmission/reception level detection value DLV with the channel 3 is 3.

FIG. 5C shows the following cases, for example.

c1. With the channel 1, a wireless LAN signal is exchanged between the access point device A2 and the terminal device Sd with the data transmission/reception level of 3, and the data transmission/reception level detection value DLV with the channel 1 is 3.

c2. With the channel 2, a wireless LAN signal is exchanged between the access point device A3 and the terminal device Sa with the data transmission/reception level of 1, and the data transmission/reception level detection value DLV with the channel 2 is 1.

c3. With the channel 3, a wireless LAN signal is exchanged between the access point device A4 and the terminal device Sb with the data transmission/reception level of 1, and the data transmission/reception level detection value DLV with the channel 3 is 1, but the reception signal level detection value LV with the channel 3 is smaller than the reception signal level detection value LV with the channel 2.

Figure 6:
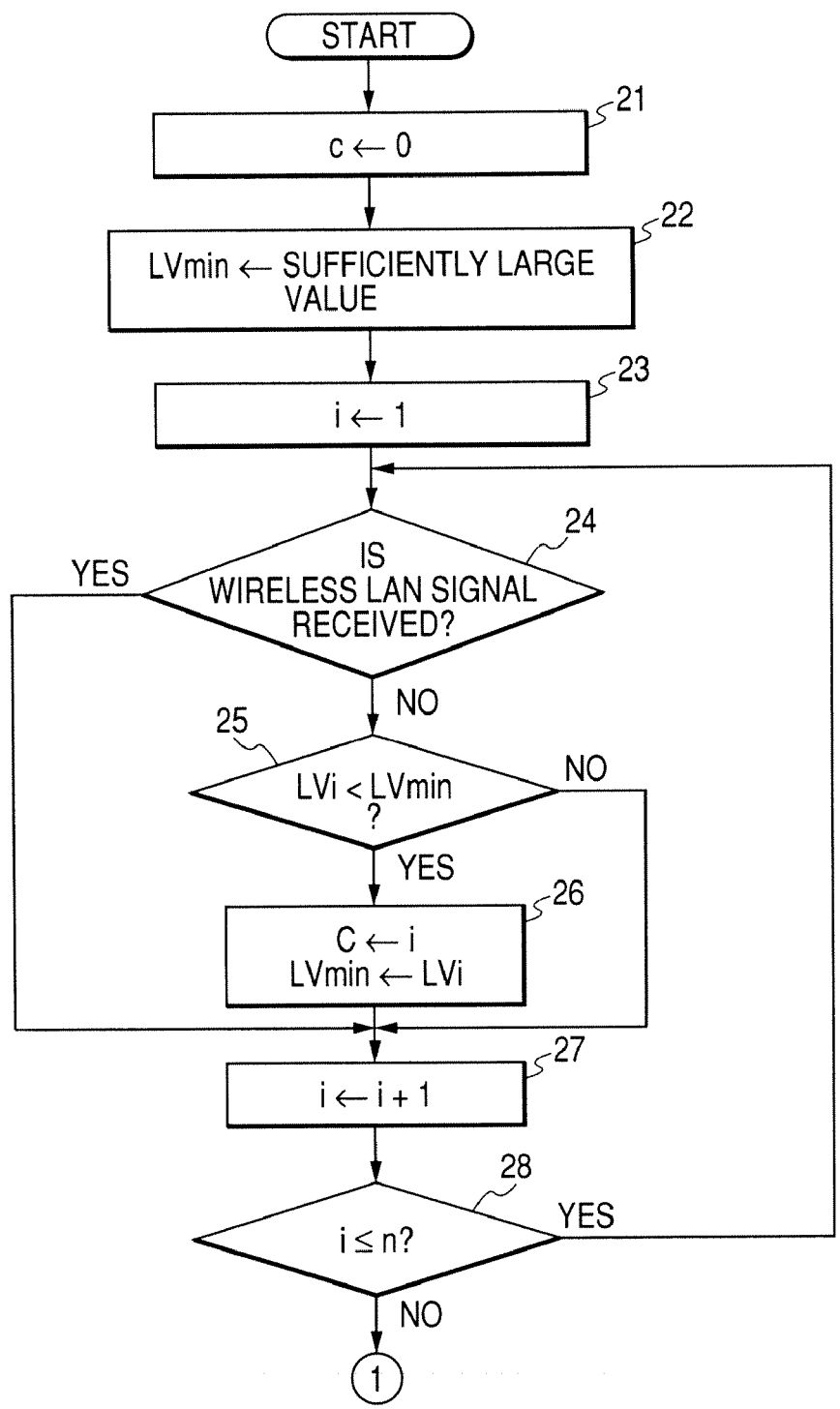
FIG. 6 is a diagram showing a part of an exemplary wireless channel determination/selection process.
Figure 7:
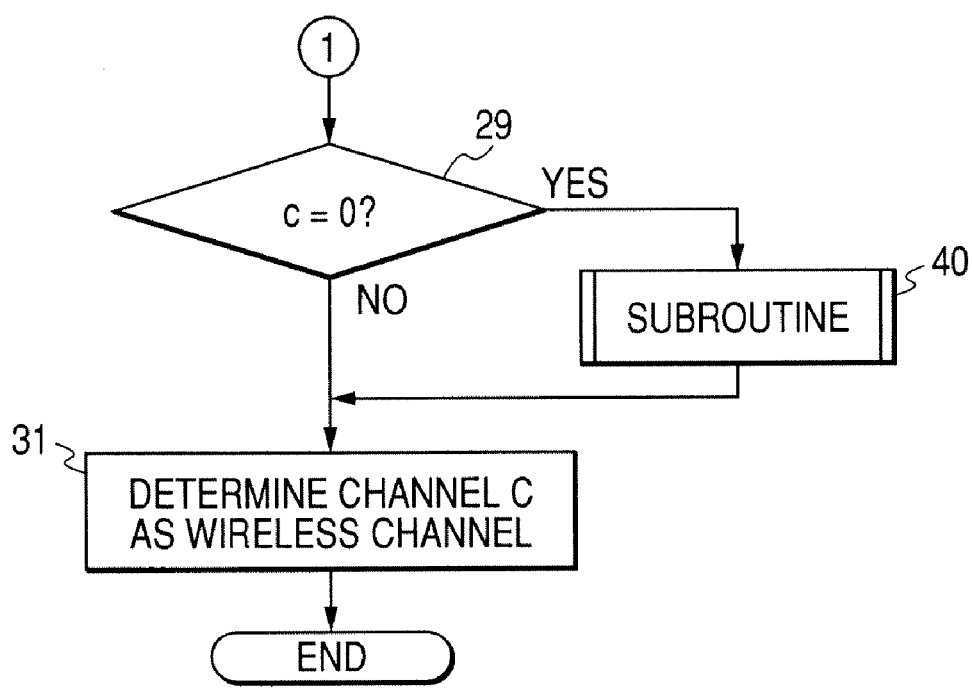
FIG. 7 is a diagram showing another part of exemplary wireless channel determination/selection process.
Figure 8:
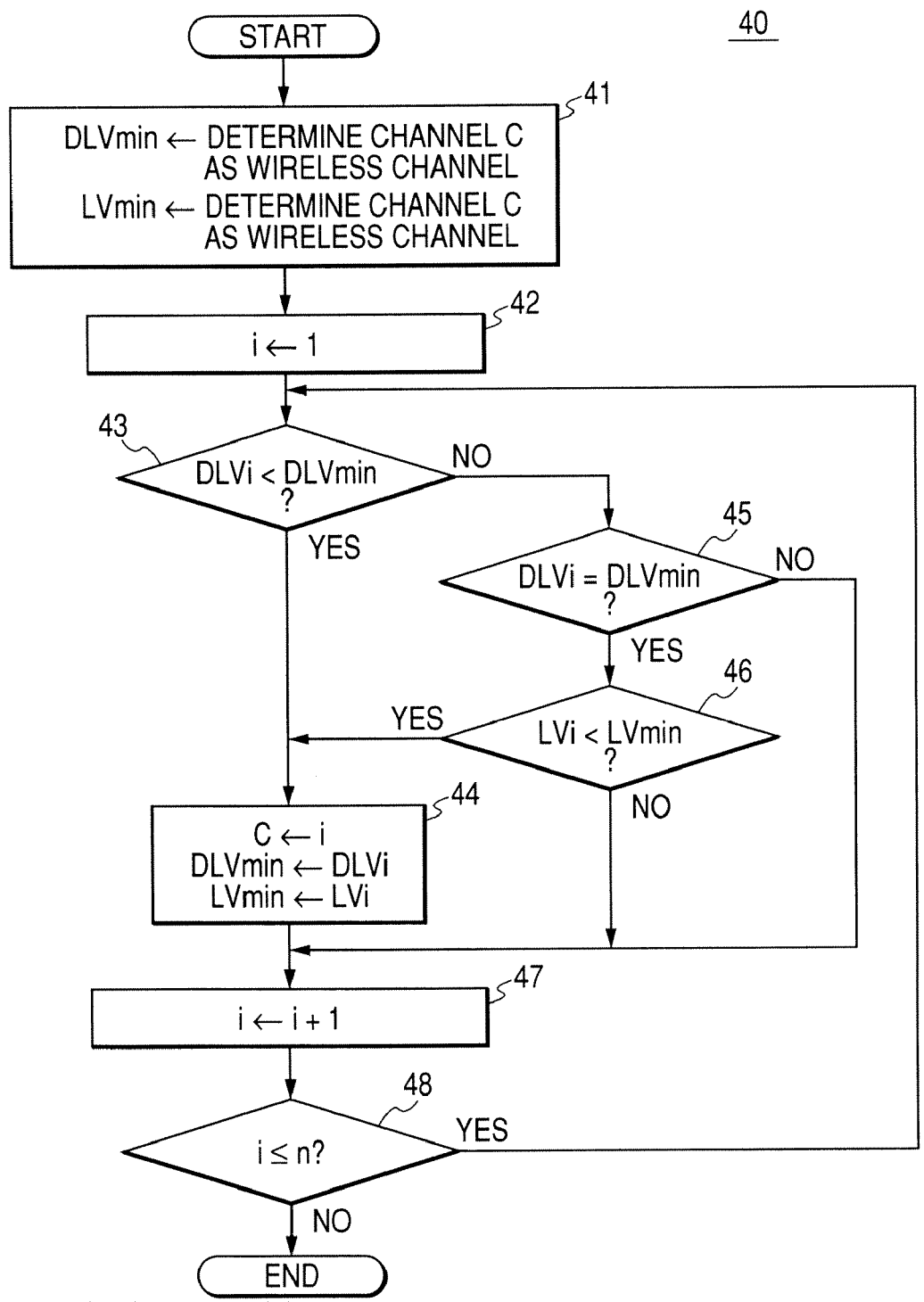
FIG. 8 is a diagram showing an exemplary subroutine of FIG. 7.

2-3. Determination and Selection of Wireless Channel: FIGS. 6 to 8

In the embodiment of the present invention, with reference to the values derived for every channel as above, i.e., the reception signal level detection values LV, the determination results AS about the existence of a wireless LAN signal, and the data transmission/reception level detection values DLV, a wireless channel considered optimum for communications is determined and selected in one specific access point device.

More specifically,

1. When any of wireless channels available for use is detected as not including a wireless LAN signal, the channel showing the minimum reception signal level detection value LV is determined and selected as a wireless channel optimum for communications.

2. When every wireless channel available for use is detected as including a wireless LAN signal, the channel showing the minimum data transmission/reception level detection value DLV is determined and selected as a wireless channel optimum for communications.

3. Note here that when the channel showing the minimum data transmission/reception level detection value DLV is found plural, the channel showing the minimum reception signal level detection value LV is determined and selected as a wireless channel optimum for communications.

Accordingly, when the radio state detection result looks like FIG. 5A, using the determination criteria of 1 above, the channel 1 is determined and selected as a wireless channel optimum for communications. When the radio state detection result looks like FIG. 5B, using the determination criteria of 2 above, the channel 2 is determined and selected as a wireless channel optimum for communications. When the radio state detection result looks like FIG. 5C, using the determination criteria of 3 above, the channel 3 is determined and selected as a wireless channel optimum for communications.

Such a wireless channel determination/selection process is executed after the control section 111 (the CPU in the control section 111) of the access point device completes the above-described radio state detection process.

FIGS. 6 and 7 both show an exemplary wireless channel determination/selection process. In the wireless channel determination/selection process in this example, first in step 21, the number C of a wireless channel that is supposed to be eventually selected is set to 0. Then in step 22, the minimum value LVmin of the reception signal level detection value LV is set to a sufficiently large value, more specifically, to a value of 1.0 or larger when the actual reception signal level detection value LV takes such values as shown in FIGS. 5A to 5C.

The procedure then goes to step 23, and the channel number i is set to 1. Then in step 24, a determination is made, for each of the channels as described above, whether or not the channel i receives a wireless LAN signal using the determination result AS stored in the memory inside of the control section 111.

When the channel i is not receiving a wireless LAN signal, the procedure goes from step 24 to step 25. In step 25, a determination is made whether or not the reception signal level detection value LVi with the channel i is smaller than the minimum value LVmin of the reception signal level detection value LV, i.e., smaller than the value set in step 22 (sufficiently large value) when i=1.

When the reception signal level detection value LVi with the channel i is smaller than the minimum value LVmin, the procedure goes from step 25 to step 26, and the number C of a wireless channel that is supposed to be eventually selected is set to the current value of i. The procedure then goes to step 27 after the minimum value LVmin is set to the reception signal level detection value LVi with the channel i.

When the channel i is determined in step 24 as receiving a wireless LAN signal, the procedure goes from step 24 to step 27. When the reception signal level detection value LVi is determined in step 25 as being the minimum value LVmin or larger, the procedure goes from step 25 to step 27.

In step 27, the channel number i is incremented only by 1. The procedure then goes to step 28, and a determination is made whether the incremented channel number i is n or smaller, i.e., when a wireless channel available for use is any of the channels 1, 2, and 3, a determination is made whether the incremented channel number i is 3 or smaller.

When the incremented channel number i is n or smaller, the procedure returns from step 28 to step 24, and the channel i after incrementation is subjected to determination in step 24, to determination in step 25 in some cases, and to the process in step 26 in some cases.

After such a process is executed to every wireless channel available for use, i.e., when wireless channels available for use are three channels of 1, 2, and 3, after such a process is executed to all of the channels 1, 2, and 3, if the determination result of step 28 tells that the incremented channel number i exceeds n, i.e., if the channel number i becomes 4 when the wireless channels available for use are three channels of 1, 2, and 3, the procedure goes to step 29. In step 29, a determination is made whether the number C of a wireless channel that is supposed to be eventually selected remains 0 or not.

When the number C is not 0, and is set to a new value in step 26 as described above, the procedure goes from step 29 to step 31, and the wireless channel is eventually determined as the channel C. When the number C remains 0, the procedure goes from step 29 to a subroutine 40.

FIG. 8 shows an exemplary sequence of processes in the subroutine 40. In the subroutine 40, when the number C remains 0, first in step 41, the minimum values are both set to a sufficiently large value, i.e., the minimum value DLVmin of the data transmission/reception level detection value DLV and the minimum value LVmin of the reception signal level detection value LV. Then in step 42, the channel number i is set to 1.

The procedure then goes to step 43, and a determination is made whether the data transmission/reception level detection value DLVi with the channel i is smaller than the minimum value DLVmin of the data transmission/reception level detection value DLV, i.e., smaller than the value set in step 41 (sufficiently large value) when i=1.

Thereafter, when the data transmission/reception level detection value DLVi with the channel i is equal to or smaller than the minimum value DLVmin, the procedure goes from step 43 to step 44. In step 44, the number C of a wireless channel that is supposed to be eventually selected is set to the current value of i, the minimum value DLVmin is set to the value of the data transmission/reception level detection value DLVi with the channel i, and the minimum value LVmin of the reception signal level detection value LV is set to the value of the reception signal level detection value LVi with the channel i. The procedure then goes to step 47.

On the other hand, when the data transmission/reception level detection value DLVi with the channel i is equal to or larger than the minimum value DLVmin, the procedure goes from step 43 to step 45. In step 45, a determination is made whether or not the data transmission/reception level detection value DLVi is equal to the minimum value DLVmin or not. When the data transmission/reception level detection value DLVi is equal to the minimum value DLVmin, the procedure goes to step 46. In step 46, a determination is made whether or not the reception signal level detection value LVi with the channel i is smaller than the minimum value LVmin of the reception signal level detection value LV, i.e., smaller than the value set in step 41 (sufficiently large value) when i=1.

When the reception signal level detection value LVi with the channel i is smaller than the minimum value LVmin, the procedure goes from step 46 to step 44. Similarly to the case where the data transmission/reception level detection value DLVi in the channel i is smaller than the minimum value DLVmin, the number C of a wireless channel that is supposed to be eventually selected is set to the current value of i, the minimum value DLVmin is set to the data transmission/reception level detection value DLVi with the channel i, and the minimum value LVmin is set to the value of the reception signal level detection value LVi with the channel i. The procedure then goes to step 47.

When the data transmission/reception level detection value DLVi is determined in step 45 as not being equal to the minimum value DLVmin (larger than the minimum value DLVmin), the procedure goes from step 45 to step 47. When the reception signal level detection value LVi is determined in step 46 as being equal to or larger than the minimum value LVmin, the procedure goes from step 46 to step 47.

In step 47, the channel number i is incremented only by 1, and the procedure goes to step48. In step 48, a determination is made whether or not the incremented channel number i is equal to or smaller than n, i.e., equal to or smaller than 3 when wireless channels available for use are the channels 1, 2, and 3.

When the incremented channel number i is equal to or smaller than n, the procedure returns from step 48 to step 43. In step 43, the channel i after incrementation is subjected to determination in step 43, to determination in steps 45 and 46 in some cases, and to the process in step 44 in some cases.

After such a process is executed to every wireless channel available for use, i.e., when wireless channels available for use are three channels of 1, 2, and 3, after such a process is executed to all of the channels 1, 2, and 3, if the determination result of step 48 tells that the incremented channel number i exceeds n, i.e., if the channel number i becomes 4 when the wireless channels available for use are three channels of 1, 2, and 3, the processes in the subroutine 40 are ended. The procedure then goes to step 31 of FIG. 7, and the wireless channel is eventually determined as the channel C.

The wireless channel eventually determined in step 31 is recorded and stored in the control section 111 of the access point device for later use for communications.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless channel determination / selection method for use in an access point device for configuring a wireless local area network (LAN) system with a terminal device, comprising:

selecting, sequentially, one of a plurality of wireless channels available for use, and, for each of the selected wireless channels, detecting a reception signal level of the selected wireless channels, determining whether a wireless LAN signal is included in the selected wireless channel, and receiving data transmission/reception state notice information included within a beacon frame provided by another access point device in the selected wireless channel, to indicate a state of data transmission/reception at the another access point device;

detecting, from the received data transmission/reception state notice information, a state of a data transmission/reception level of the another access point device for each of the wireless channels; and determining and selecting, based on a process of a processor of the access point device, any of the wireless channels considered optimum for communications through reference to, for each of the wireless channels, the detected reception signal level, a determination result of whether the wireless LAN signal is included, and the detected state of the data transmission/reception level, wherein, in the determining, when any of the wireless channels available for use are detected as not including a wireless LAN signal, one of the wireless channels detected as not including a wireless LAN signal that has a minimum detected reception signal level is determined and selected as being optimum for communications, when all of the wireless channels available for use are detected as including a wireless LAN signal and a single wireless channel having an optimum detected state of the data transmission/reception level exists, the wireless channel having the optimum detected state of the data transmission/reception level is determined and selected as being optimum for communications, and when all of the wireless channels available for use are detected as including a wireless LAN signal and multiple wireless channels exist having an optimum detected state of the data transmission/reception level, one of the wireless channels having the optimum detected state of the data transmission/reception level that has the minimum detected reception signal level is determined and selected as being optimum for communications.

2. An access point device for configuring a wireless local area network (LAN) system with a terminal device, comprising:

wireless LAN communications means for performing data transmission/reception receiving beacon including data transmission/reception state notice information provided by other access point devices indicating a state of data transmission/reception at the other access point devices, and transmitting a beacon frame including data transmission/reception state notice information that indicates a state of data transmission/reception of the access point device; and control means for placing the wireless LAN communications means into a state ready for reception, sequentially selecting one of a plurality of wireless channels available for use, and, for each of the wireless channels selected, detecting a reception signal level of the selected wireless channel, determining whether a wireless LAN signal is included in the selected wireless channel, and receiving data transmission/reception state notice information included within a beacon frame provided by another access point device in the selected wireless channel, detecting a state of a data transmission/reception level for each of the wireless channels from the received data transmission/reception state notice information, and determining and selecting any of the wireless channels considered optimum for communications through reference to, for each of the wireless channels, the detected reception signal level, a determination result of whether the wireless LAN signal is included, and the detected state of the data transmission/reception level, wherein, the control means determines and selects, when any of the wireless channels available for use are detected as not including a wireless LAN signal, one of the wireless channels detected as not including a wireless LAN signal that has a minimum detected reception signal level as being optimum for communications, determines and selects, when all of the wireless channels available for use are detected as including a wireless LAN signal and a single wireless channel having an optimum detected state of the data transmission/reception level exists, the wireless channel having the optimum detected state of the data transmission/reception level as being optimum for communications, and when all of the wireless channels available for use are detected as including a wireless LAN signal and multiple wireless channels exist having the optimum detected state of the data transmission/reception level, one of the wireless channels having the optimum detected state of the data transmission/reception level that has the minimum detected reception signal level is determined and selected as being optimum for communications.

3. An access point device for configuring a wireless local area network (LAN) system with a terminal device, comprising:

wireless LAN communications means for performing data transmission/reception receiving beacon frames including data transmission/reception state notice information provided by other access point devices indicating a state of data transmission/reception at the other access point devices, and transmitting a beacon frame including data transmission/reception state notice information that indicates a state of data transmission/reception of the access point device; and a control section placing the wireless LAN communications means into a state ready for reception, sequentially selecting one of a plurality of wireless channels available for use, and, for each of the wireless channels selected, detecting a reception signal level of the selected wireless channel, determining whether a wireless LAN signal is included in the selected wireless channel, and receiving data transmission/reception state notice information included within a beacon frame provided by another access point device in the selected wireless channel, detecting a state of a data transmission/reception level for each of the wireless channels from the received data transmission/reception state notice information, and determining and selecting any of the wireless channels considered optimum for communications through reference to, for each of the wireless channels, the detected reception signal level, a determination result of whether the wireless LAN signal is included, and the detected state of the data transmission/reception level, wherein, the control section determines and selects, when any of the wireless channels available for use are detected as not including a wireless LAN signal, one of the wireless channels detected as not including a wireless LAN signal that has a minimum detected reception signal level as being optimum for communications, determines and selects, when all of the wireless channels available for use are detected as including a wireless LAN signal and a single wireless channel having an optimum detected state of the data transmission/reception level exists, the wireless channel having the optimum detected state of the data transmission/reception level as being optimum for communications, and when all of the wireless channels available for use are detected as including a wireless LAN signal and multiple wireless channels exist having the optimum detected state of the data transmission/reception level, one of the wireless channels having the optimum detected state of the data transmission/reception level that has the minimum detected reception signal level is determined and selected as being optimum for communications.

* * * * *